United States Patent [19]
de Groot

[11] Patent Number: 5,663,793
[45] Date of Patent: Sep. 2, 1997

[54] HOMODYNE INTERFEROMETRIC RECEIVER AND CALIBRATION METHOD HAVING IMPROVED ACCURACY AND FUNCTIONALITY

[75] Inventor: Peter de Groot, Middletown, Conn.

[73] Assignee: Zygo Corporation, Middlefield, Conn.

[21] Appl. No.: 523,559

[22] Filed: Sep. 5, 1995

[51] Int. Cl.$^6$ .................................................. G01B 9/02
[52] U.S. Cl. ........................................ 356/351; 356/357
[58] Field of Search ................................. 356/345, 351, 356/359, 360, 357

[56] References Cited

U.S. PATENT DOCUMENTS

| | | | |
|---|---|---|---|
| 4,798,468 | 1/1989 | Ohuchi | 356/351 |
| 4,842,408 | 6/1989 | Yoshii et al. | 356/351 |
| 5,018,862 | 5/1991 | Aiello . | |
| 5,243,649 | 9/1993 | Franson | 356/351 |
| 5,374,991 | 12/1994 | Atkinson et al. . | |
| 5,392,116 | 2/1995 | Makosch . | |

OTHER PUBLICATIONS

A. Dorsey, R. J. Hocken, M. Horowitz, "A low cost laser interferometer system for machine tool applications" (Precision Eng. 5 p. 29, 1983).

R. Smythe, R. Moore, "Instantaneous phase measuring interferometry" (Proc. Soc. Phot. Opt. Instr. Eng. 429 p. 16, 1983).

V. Greco, G. Molesini, F. Quercioli, "Accurate polarization interferometer" (Rev. Sci. Instrum. 66 p. 3729, 1994).

P.L.M. Heydemann, "Determination and correction of quadrature infringe measurement errors in interferometers" (Appl. Opt. 20 p. 3382, 1981).

*Primary Examiner*—Frank G. Font
*Assistant Examiner*—Robert Kim
*Attorney, Agent, or Firm*—Lawrence G. Kurland, Esq.; Bryan Cave LLP

[57] ABSTRACT

A method and system for measuring the phase difference between two orthogonally polarized components of a test beam as well as the intensities of these two components. A partially-polarizing beamsplitter (101) divides a polarized test beam (103) into first and second spatially-separated beams (154,104). The first beam (154) passes through a wave plate (160) oriented so as to retard the phase of the s polarization component with respect to the p polarization component. The first beam (154) then passes through a first polarizing beamsplitter (155), to produce a first pair of spatially separated output beams (156,157) with mutually-orthogonal linear polarizations. The second beam (104) is likewise passed through a second polarizing beamsplitter (105) to produce a second pair of linearly-polarized output beams (106,107). Photodetectors (108,109,158,159) send an electrical signals proportional to the intensities of the beams (106,107,156,157) to a computer (99). The computer (99) calculates the phase difference between the s and p polarization components of the test beam, as well as the relative intensities of the s and p polarization components of the test beam. The invention also provides methods and means for calibrating the inventive apparatus using polarizing elements (52,53,54) and a beam block (51). The calibration procedure determines the phase retardance of the wave plate (155), the polarizing characteristics of the partially-polarizing beamsplitter (101), and the electrical characteristics of each of the photodetectors (108,109,158,159).

31 Claims, 1 Drawing Sheet

HOMODYNE INTERFEROMETRIC RECEIVER AND CALIBRATION METHOD HAVING IMPROVED ACCURACY AND FUNCTIONALITY

FIELD OF THE INVENTION

The present invention relates to high-speed, high precision interferometers, ellipsometers and flying height testers. In particular, the invention relates to a homodyne interferometric apparatus and method for measuring the phase difference between two orthogonally polarized components of a test beam as well as the intensities of these two components.

BACKGROUND AND PRIOR ART

The fundamental problem in optical metrology is interferometric phase estimation. Distance measuring interferometers, ellipsometers, flying height testers and other optical instruments depend on an accurate measurement of relative phase between two orthogonal components of a polarized test beam of light. A device or subsystem that performs this task will be referred to herein as an interferometric receiver. Modern interferometric receivers must perform at high speed, with excellent repeatability and linearity. A further problem in optical metrology is the measurement of the intensities of two orthogonally polarized components of a polarized test beam. An example of a technology for which the interferometric receiver must provide both phase and intensity information for the two polarization components is taught in my commonly owned, co-pending U.S. patent application entitled "Optical Gap Measuring Apparatus and Method" filed Mar. 22, 1995 and bearing U.S. Ser. No. 08/408,907.

There are frequent references in the art to heterodyne methods of phase estimation, in which the phase varies with time in a controlled way. For example, in a known form of prior-art heterodyne distance-measuring interferometer, the source emits two orthogonal polarizations having slightly different optical frequencies (e.g. 2 MHz). The interferometric receiver in this case is typically comprised of a linear polarizer and a photodetector to measure the time-varying interference signal. The signal oscillates at the beat frequency, and the phase of the signal corresponds to the relative phase difference. A further representative example of the prior art in heterodyne distance-measuring interferometry is taught in commonly-owned U.S. Pat. No. 4,688,940 to G. E. Sommargren and M. Schaham (1987). On the one hand, an important advantage of the heterodyne technique is that the interferometric receiver is simple to construct and to calibrate. On the other hand, the heterodyning requires a specialized source, such as a Zeeman-split HeNe laser, or a high-speed modulator. Further, heterodyne interferometric receivers do not provide any information regarding the intensities of two orthogonally polarized components of a polarized test beam.

There are also frequent references in the art to homodyne methods of phase estimation, which uses a single-frequency source together with an interferometric receiver comprised of a plurality of photodetectors corresponding to static phase shifts. In a typical homodyne receiver, the phase estimation is performed by introducing static phase shifts via polarizing components such as wave plates. Representative prior art includes regarding such homodyne methods U.S. Pat. No. 5,374,991 to L. G. Atkinson, K. J. Vent, J. P. Wong, U.S. Pat. No. 5,018,862 to M. F. Aiello, and U.S. Pat. No. 5,392,116 to G. Makosch. Additional prior art regarding homodyne techniques is taught in an article entitled "A low cost laser interferometer system for machine tool applications" by A. Dorsey, R. J. Hocken and M. Horowitz (Precision Eng. 5 p.29, 1983), in an article entitled "Instantaneous phase measuring interferometry" by R. Smythe and R. Moore (Proc. Soc. Phot. Opt. Instr. Eng. 429 p.16, 1983) and in an article entitled "Accurate polarization interferometer" by V. Greco, G. Molesini, F. Quercioli (Rev. Sci. Instrum. 66 p.3729, 1994). The advantage of the homodyne technique is that it does not require a frequency difference between the polarization components of the test beam. However, there is a much greater concern with respect to the fidelity of the polarizing components and the differences in photodetector response. Generally, prior-art homodyne receivers are inaccurate, difficult to align and require expensive components. Prior-art homodyne receivers also do not provide any information regarding the relative strengths of the two orthogonal polarization components of the test beam.

The prior art provides some examples of calibration techniques which have been employed in an effort to improve homodyne receiver performance. A representative technique is taught in an article entitled "Determination and correction of quadrature fringe measurement errors in interferometers" by P. L. M. Heydemann (Appl. Opt. 20, p.3382, 1981). However, the prior art method taught by Heydemann applies to a simple quadrature homodyne receiver having only two detectors. This two-detector receiver is known to be disadvantageously sensitive to intensity fluctuations in the test beam. Further, the prior art calibration method taught by Heydemann does not compensate for the polarizing behavior of all of the optical elements, including in particular the beamsplitter that provides the signals for the two detectors. Finally, the Heydemann article does not teach a technique for calculating the relative strengths of the two orthogonal polarization components of the test beam.

Thus, although there is a significant advantage of the homodyne technique with respect to the light source, this advantage is often outweighed by the above mentioned concerns and difficulties. Consequently, it would be desirable to provide an improved homodyne receiver which could overcome or minimize these difficulties and concerns while still providing the advantages of the homodyne technique regarding the light source.

There is therefore an unmet need for an apparatus and method for high-speed, high precision measurement of the phase difference between two orthogonally polarized components of a test beam as well as the intensities of these two components. The present invention overcomes these disadvantages of the prior art by providing accurate values without the need for perfect optical elements and without requiring the type of specialized light sources needed for prior art heterodyne techniques.

SUMMARY OF THE INVENTION

According to the presently preferred method and apparatus of the present invention, a polarized test beam is directed into a homodyne receiver where a partially-polarizing beamsplitter divides the test beam into first and second spatially-separated beams. The plane of incidence of the test beam on the partially-polarizing beamsplitter defines a polarization direction p and an orthogonal polarization direction s. The term "partially polarizing beamsplitter", as used herein, means that the p and s components of the test beams are not equally divided into the first and second beams. For example, a common plate beamsplitter reflects approximately half as much of the p component intensity as it transmits.

The first of the spatially separated beams then preferably passes through a birefringent element, which may be a wave plate or like device, oriented so as to retard the phase of the s polarization component with respect to the p polarization component. This phase-retarded first spatially separated beam then preferably passes through a first polarizing beamsplitter, which may for example be a Wollaston prism or like birefringent crystal, to produce a first pair of spatially separated output beams with mutually-orthogonal linear polarizations. Preferably, the first polarizing beamsplitter is so oriented as to mix substantially equal amounts of the s and p polarization components of the phase-retarded first spatially separated beam in each of its two output beams. Each of the two output beams from the first polarizing beamsplitter then preferably impinges upon a corresponding photodetector, which sends an electrical signal proportional to the output beam intensity impinging on it to a conventional computer or digital signal processor. Preferably, at the same time, the second spatially separated beam generated by the partially-polarizing beamsplitter is likewise passed through a second polarizing beamsplitter to produce a second pair of output beams with mutually-orthogonal linear polarizations. The second polarizing beamsplitter is preferably so oriented as to mix substantially equal amounts of the s and p polarization components of the second spatially separated beam in each of its two output beams. Each of the two output beams from this second polarizing beamsplitter preferably impinges upon a corresponding photodetector, which sends an electrical signal proportional to the output beam intensity impinging on it to the computer or digital signal processor. Finally, electrical signals from the four photodetectors are preferably analyzed by the computer or digital signal processor to determine the phase difference between the s and p polarization components of the test beam, as well as the relative intensities of the s and p polarization components of the test beam.

The present invention also preferably provides methods and means for calibrating the presently preferred homodyne receiver. Such means preferably comprise polarizing elements which may be inserted into the test beam just prior to entering the main portion of the presently preferred homodyne receiver. According to a preferred method of the present invention, a sequence of three linear polarizers oriented along the s, p, and an intermediate orientation angle are preferably inserted into the test beam. The computer preferably records the photodetector signals for each polarizer and processes the data to determine the phase retardance provided by the wave plate, the polarizing characteristics of the partially-polarizing beamsplitter, and the electrical characteristics of each of the photodetectors.

The above set forth and other features of the present invention, including computational procedures, details of preferred embodiments and methods of implementation, are made more apparent in the ensuing detailed description of the invention when read in conjunction with the attached sole figure in the drawing.

DETAILED DESCRIPTION OF THE INVENTION

Figure 1:
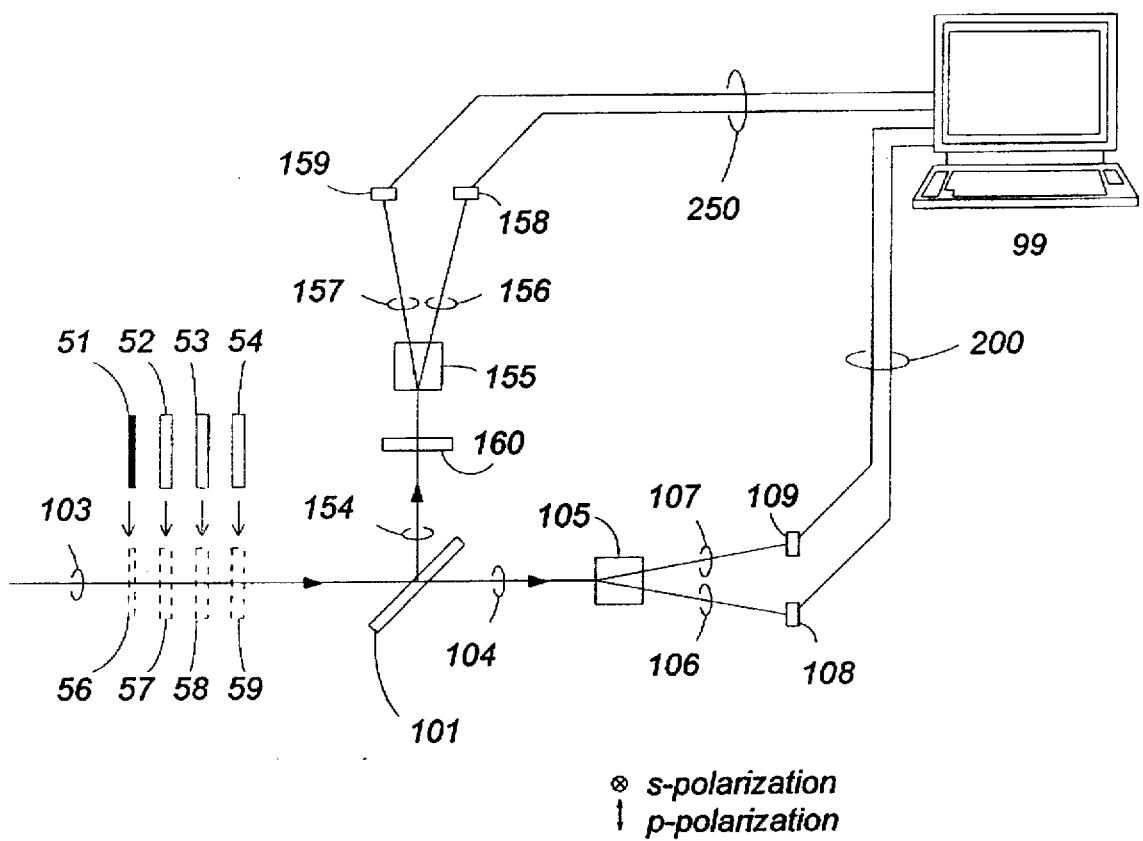
FIG. 1 is a diagrammatic illustration showing a presently preferred embodiment of the homodyne receiver of the present invention capable of carrying out the presently preferred method of the present invention.

Referring now to the drawings in detail, and particularly to the sole figure, FIG. 1 shows a presently preferred embodiment of the homodyne receiver of the present invention capable of carrying out the presently preferred method of the present invention. As shown and preferred, a test beam 103 is preferably directed into the homodyne receiver. A beamsplitter 101 preferably divides beam 103 into a first beam 154 and a second beam 104. The polarization state of test beam 103 may be described in terms of the two orthogonal polarization components p and s, where p refers to the component parallel to the plane of incidence of the beam with respect to beamsplitter 101. Beamsplitter 101 is preferably partially polarizing, that is, it does not equally divide both the p and s components into beams 154 and 104. For example, a conventional common plate beamsplitter will separate equally the s component of test beam 103 but will reflect approximately half as much of the p component into beam 154 as it transmits into beam 104.

Beam 154 then preferably passes through a wave plate 160, which changes the phase of the s component relative to the p component. This phase change $\phi$ may preferably be either positive or negative, but has for its approximate absolute value the quantity $\pi/2$. The phase change need not be exact for correct function of the presently preferred apparatus of the present invention. It has been found that it is sufficient if this phase change $\phi$ is accurate to $\pm 30\%$ of the nominal $\pi/2$ value. This phase change $\phi$ may be an effective phase change, including such additional factors as residual stress birefringence in beamsplitter 101. After passing through wave plate 160, a polarizing beamsplitter 155, such as a conventional Wollaston prism or like optical element preferably divides beam 154 into two beams 156 and 157 having orthogonal linear polarizations. Polarizing beamsplitter 155 is preferably oriented so as to mix equal quantities of the s and p components of beam 154 into both beams 156 and 157. For example, if beamsplitter 155 is a Wollaston prism, it is preferably oriented so that the plane defined by beams 156 and 157 is at a 45-degree angle with respect to the plane of FIG. 1. Beams 156 and 157 preferably impinge upon photodetectors 158 and 159 respectively, which produce electrical signals proportional to the intensities of beams 156 and 157 respectively. These electrical signals preferably pass through electrical cables 250 to a conventional computer 99, which may be a conventional desktop computer with a video monitor, or any conventional alternative electronic processing means capable of performing the computations described further below in the greater detail.

Preferably, at the same time that beam 154 is being processed, the second beam 104 from beamsplitter 101 passes through another polarizing beamsplitter 105, which may also be a conventional Wollaston prism or like optical element. Polarizing beamsplitter 105 preferably creates two beams 106 and 107 having orthogonal linear polarizations. Polarizing beamsplitter 105 is also preferably oriented so as to mix equal quantities of the s and p components of beam 104 into both beams 106 and 107. Beams 106 and preferably 107 impinge upon two photodetectors 108 and 109, respectively, which preferably generate electronic signals which pass through cables 200 to computer 99 which is receiving the electronic signals from photodetectors 158 and 159 as well.

Photodetectors 108, 158, 109 and 159 produce four voltages $\tilde{v}_1, \tilde{v}_2, \tilde{v}_3, \tilde{v}_4$ respectively, each with its own gain and electrical offset $v_j^0$, where $j=1, \ldots 4$. The offset-corrected voltages are $$v_j = \tilde{v}_j - v_j^0.$$

These voltages contain information about the phase difference ($\theta$) between the two polarization components s and p, as well as the intensities $I_s$ and $I_p$ of the two polarization components s and p. Presently, the accurate determination of the quantities $\theta$, $I_s$, $I_p$ normally requires calibration of the presently preferred apparatus of the present invention. Preferably, the presently preferred homodyne receiver apparatus is characterized by 11 independent, constant parameters. These parameters are the effective p-polarization reflectivity $\hat{R}_p$ and transmisivity $\hat{T}_p$ of beamsplitter 101, four inverse gain coefficients $g_{1..4}$ for photodetectors 108,158, 109 and 159, four offset voltages $v_{1..4}^o$ for photodetectors 108,158,109 and 159, and the effective wave plate retardance $\phi$. Computer 99 preferably conventionally calculates the numerical value of these constant parameters following a presently preferred calibration procedure, comprising the four steps outlined as follows:

Step 1: Block the test beam 103 using an opaque object 51 in a position 56 and measure the photodetector offset voltages $v_{1..4}^o$ Step 2: Polarize the test beam 103 along s using a polarizer 52 in a position 57 and measure the offset-corrected photodetector voltages $v_{1..4}^s$. Then polarize the test beam along p using a polarizer 53 in position 58 and measure the offset-corrected photodetector voltages $v_{1..4}^p$. Make sure that the intensities for these two polarizations are substantially equal. Calculate $\hat{R}_p$, $\hat{T}_p$ using the formulas $\hat{R}_p = \frac{1}{2}(v_1^p/v_1^s + v_3^p/v_3^s)$ $\hat{T}_p = \frac{1}{2}(v_2^p/v_2^s + v_4^p/v_4^s)$ Step 3: Calculate the inverse gains $g_{1..4}$ using the formulas $g_1 = 1$ $g_2 = (v_1^s/v_2^s)$ $g_3 = (v_1^s/v_3^s)$ $g_4 = (v_1^s/v_4^s)$ Step 4: Polarize the test beam linearly using a polarizer 54 in a position 59 so that both s & p are present in the test beam. Measure the photodetector voltages $v''_{1..4}$ for this configuration. Calculate the effective wave plate retardance $\phi$ using the formula $\phi = \cos^{-1}(-\hat{Q}\sqrt{\hat{T}_p/\hat{R}_p})$ where $\hat{Q} = \frac{g_3 v_3'' - g_1 v_1''}{g_2 v_2'' - g_4 v_4''}$ Assuming that the above presently preferred calibration procedure taught has yielded accurate values for the parameters $\hat{R}_p$, $\hat{T}_p$, $g_{1..4}$, $v_{1..4}^o$, $\phi$ the presently preferred homodyne receiver of the present invention is ready to analyze the test beam 103. According to a presently preferred method of the present invention, computer 99 preferably calculates the phase difference $\theta$ between the s and p polarization states using the formula $\theta = \tan^{-1}\left(\frac{\hat{a}\hat{Q}_n + \hat{b}\hat{Q}_n}{\hat{Q}_d}\right)$ where $\hat{Q}_n = g_1 v_1 - g_3 v_3$ $\hat{Q}_d = g_2 v_2 - g_4 v_4$ $\hat{a} = \sqrt{\frac{\hat{T}_p}{\hat{R}_p}} \cdot \frac{1}{\sin(\phi)}$ $\hat{b} = \cot(\phi)$ The intensities $I_s$ and $I_p$ are proportional to voltages $v_s$ and $v_p$, calculated by computer 99 according to the formulas $v_s = \frac{\hat{T}_p v_r - \hat{R}_p v_t}{\hat{T}_p - \hat{R}_p}$ $v_p = \frac{v_t - v_r}{\hat{T}_p - \hat{R}_p}$ where $v_r = \frac{1}{2}(g_1 v_1 + g_3 v_3)$ $v_t = \frac{1}{2}(g_2 v_2 + g_4 v_4)$ The above procedure preferably completes the presently-preferred data processing for the presently preferred method and apparatus of the present invention.

An alternative embodiment of the present present invention suitable for distance measuring applications preferably includes a further data processing step to remove the $2\pi$ phase ambiguity inherent to interferometric phase detection. This further preferred data processing step preferably comprises application of the following formula $\theta'' = \theta' - 2\pi \, Int\left(\frac{\theta' - \theta}{2\pi}\right),$ where $\theta'$ is the current phase measurement, $\theta$ is the most recent previous phase measurement, $\theta''$ is the ambiguity-corrected phase measurement, and Int( ) is a function which returns the nearest integer to its argument. This preferred further data processing step makes it possible to measure large displacements with high precision.

Among the known advantages of the homodyne receiver and method of the present invention are: (1) the invention provides the phase difference $\theta$ between the two orthogonal polarization components s and p, as well as the intensities $I_s$ and $I_p$ of a polarized light beam; (2) the presently preferred method does not require any modulation of the input beam of the present invention contrary to what is required for prior-art heterodyne techniques; (3) the preferred apparatus of the present invention has no moving parts; (4) the preferred method of the present invention comprises a calibration procedure that obviates the need for perfect optical elements; and (5) the present invention provides unusually accurate values for $\theta$, $I_s$, $I_p$ with respect to comparable prior art.

Those skilled in the art will also appreciate that small changes, additions or modifications to the preferred embodiment may be made without departing from the spirit of the invention. For example, the phase retarder 160 can be placed in the second spatially separated beam 104 to achieve the same results. Further, fewer or greater number of polarizing elements may be used in the calibration procedure to achieve substantially the same results.

What is claimed is:

1. A method capable of measuring the phase difference between two orthogonally polarized components of a polarized test beam and the intensities of these components, said method comprising the steps of:

dividing said polarized test beam into first and second spatially separated beams, said test beam having p and s components such that p represents a polarization direction and s represents an orthogonal polarization direction, said p and s components being unequally divided into said first and second spatially separated beams;

retarding the phase of one of the unequally divided polarization components with respect to the other unequally divided polarization component in said spatially separated beams;

producing a first pair of spatially separated output beams with mutually orthogonal linear polarizations from said phase retarded first spatially separated beam, said first pair of output beams comprising substantially equal amounts of the s and p polarization components of said phase retarded first spatially separated beam;

converting said first pair of output beams into a first set of electrical signals proportional to the conversion output beam intensity and providing said first set of electrical signals to a data processor for analysis thereof;

producing a second pair of spatially separated output beams with mutually orthogonal linear polarizations from said second spatially separated beam, said second pair of output beams comprising substantially equal amounts of the s and p polarization components of said second spatially separated beam;

converting said second pair of output beams into a second set of electrical signals proportional to the corresponding output beam intensity and providing said second set of electrical signals to said data processor for analysis thereof along with said first set of electrical signals; and determining at least the phase difference between unequally divided s and p polarization components of said test beam from said analysis of said electrical signals; whereby imperfect components may be employed for retarding the phase of one of the unequally divided polarization components and for dividing said polarized test beam into said unequally divided polarization components.

2. A method in accordance with claim 1 wherein said determining step further comprises the step of determining the relative intensities of the unequally divided s and p polarization components of said test beam from said analysis of said electrical signals for measuring the relative strengths of the s and p polarization states of said test beam.

3. A method in accordance with claim 2 wherein said dividing step comprises dividing said polarized test beam into said first and second spatially separated beams in a homodyne receiver apparatus.

4. A method in accordance with claim 1 wherein said dividing step comprises dividing said polarized test beam into said first and second spatially separated beams in a homodyne receiver apparatus.

5. A method in accordance with claim 4 wherein said dividing step comprises the step of dividing said polarized test beam by directing said test beam to a partially polarizing beamsplitter, the plane of incidence of the test beam on said partially polarizing beamsplitter defining said s and p polarization directions.

6. A method in accordance with claim 5 wherein said phase retarding step comprises the step of passing said first spatially separated beam through a birefringent element.

7. A method in accordance with claim 4 wherein said phase retarding step comprises the step of passing said first spatially separated beam through a birefringent element.

8. A method in accordance with claim 6 wherein said step of producing said first pair of spatially separated output beams comprises the step of passing said phase retarded first spatially separated beam through a first polarizing beamsplitter for producing said first pair of spatially separated output beams.

9. A method in accordance with claim 4, wherein said step of producing said first pair of spatially separated output beams comprises the step of passing said phase retarded first spatially separated beam through a first polarizing beamsplitter for producing said first pair of spatially separated output beams.

10. A method in accordance with claim 8 wherein said step of converting said first pair of output beams into said first set of electrical signals comprises the step of impinging each of said first pair of output beams upon a corresponding photodetector for providing said first set of electrical signals.

11. A method in accordance with claim 4 wherein said step of converting said first pair of output beams into said first set of electrical signals comprises the step of impinging each of said first pair of output beams upon a corresponding photodetector for providing said first set of electrical signals.

12. A method in accordance with claim 4 wherein said first and second set of electrical signals are provided to said data processor for analysis at substantially the same time.

13. A method in accordance with claim 1 wherein said first and second set of electrical signals are provided to said data processor for analysis at substantially the same time.

14. A method in accordance with claim 5 wherein said step of producing said second pair of spatially separated output beams comprises the step of passing said second spatially separated beam through a second polarizing beamsplitter for producing said second pair of spatially separated output beams.

15. A method in accordance with claim 4 wherein said step of producing said second pair of spatially separated output beams comprises the step of passing said second spatially separated beam through a second polarizing beamsplitter for producing said second pair of spatially separated output beams.

16. A method in accordance with claim 14 wherein said step of converting said second pair of output beams into said second set of electrical signals comprises the step of impinging each of said second pair of output beams upon a corresponding photodetector for providing said second set of electrical signals.

17. A method in accordance with claim 4 wherein said step of converting said second pair of output beams into said second set of electrical signals comprises the step of impinging each of said second pair of output beams upon a corresponding photodetector for providing said second set of electrical signals.

18. A method in accordance with claim 4 further comprising the step of calibrating said homodyne receiver apparatus.

19. A method in accordance with claim 18 wherein said calibrating step further comprises the step of inserting a sequence of at least three linear polarizers oriented along the s, p, and an intermediate orientation angle into said test beam.

20. A method in accordance with claim 7 wherein said birefringent element comprises a wave plate.

21. A method in accordance with claim 9 wherein said first polarizing beamsplitter comprises a Wollaston prism.

22. A method capable of measuring the phase difference between two orthogonally polarized components of a polarized test beam and the intensities of these components, said method comprising the steps of:

dividing said polarized test beam into first and second spatially separated beams, said test beam having p and s components such that p represents a polarization direction and s represents an orthogonal polarization direction, said p and s components being unequally divided into said first and second spatially separated beams;

retarding the phase of one of the unequally divided polarization components with respect to the other unequally divided polarization component in said spatially separated beams;

producing a first pair of spatially separated output beams with mutually orthogonal linear polarizations from said phase retarded first spatially separated beam, said first pair of output beams comprising substantially equal amounts of the s and p polarization components of said phase retarded first spatially separated beam;

converting said first pair of output beams into a first set of electrical signals proportional to the conversion output beam intensity and providing said first set of electrical signals to a data processor for analysis thereof;

producing a second pair of spatially separated output beams with mutually orthogonal linear polarizations from said second spatially separated beam, and second pair of output beams comprising substantially equal amounts of the s and p polarization components of said second spatially separated beam;

converting said second pair of output beams into a second set of electrical signals proportional to the corresponding output beam intensity and providing said second set of electrical signals to said data processor for analysis thereof along with said first set of electrical signals; and determining at least the relative intensities of the unequally divided s and p polarization components of said test beam from said analysis of said electrical signal for measuring the relative strengths of the s and p polarization states of said test beam.

23. A method in accordance with claim 22 wherein said dividing step comprises dividing said polarized test beam into said first and second spatially separated beams in a homodyne receiver apparatus.

24. A homodyne receiver apparatus capable of measuring the phase difference between two orthogonally polarized components of a polarized test beam and the intensities of these components, said apparatus comprising:

means for receiving said polarized test beam and dividing it into first and second spatially separated beams, said test beam having s and p components such that p represents a polarization direction and s represents an orthogonal polarization direction, said means for receiving and dividing said test beam further comprising means for unequally dividing said s and p components into said first and second spatially separated beams:

phase retarding means optically aligned with one of said spatially separated beams for retarding the phase of one of the unequally divided polarization components with respect to the other unequally divided polarization component of said spatially separated beams passing through said phase retarding means for providing a phase retarded spatially separated beam;

polarizing beamsplitting means optically aligned with said phase retarded first spatially separated beam and with said second spatially separated beam, respectively, for producing first and second pairs of spatially separated output beams, respectively, each having mutually orthogonal linear polarizations with each of said first pair of output beams having substantially equal amounts of the s and p polarization components of said phase retarded first spatially separated beam and with each of said second pair of output beams having substantially equal amounts of the s and p polarization components of said second spatially separated beam;

photodetector means optically aligned with each of said output beams for producing a set of electrical signals proportional to the respective output beam intensities of said output beams; and means for determining at least the phase difference between said unequally divided s and p polarization components of said test beam from said electrical signals; whereby said phase retarding means and said polarizing beam splitting means may comprise imperfect components.

25. A homodyne receiver apparatus in accordance with claim 24 wherein said determining means further comprises means for determining the relative intensities of the unequally divided s and p polarization components of said test beam from said electrical signals for measuring the relative strengths of the s and p polarization states of said test beam.

26. A homodyne receiver apparatus in accordance with claim 25 wherein said phase retarding means comprises a birefringent element.

27. A homodyne receiver apparatus in accordance with claim 26 wherein said birefringent element comprises a wave plate.

28. A homodyne receiver apparatus in accordance with claim 27 wherein said polarizing beamsplitter means comprises a Wollaston prism.

29. A homodyne receiver apparatus in accordance with claim 24 wherein said polarizing beamsplitter means comprises a Wollaston prism.

30. A homodyne receiver apparatus in accordance with claim 24 wherein said phase retarding means comprises a birefringent element.

31. A homodyne receiver apparatus capable of measuring the phase difference between two orthogonally polarized components of a polarized test beam and the intensities of these components, said apparatus comprising:

means for receiving said polarized test beam and dividing it into first and second spatially separated beams, said test beam having s and p components such that p represents a polarization direction and s represents an orthogonal polarization direction, said means for receiving and dividing said test beam further comprising means for unequally dividing said s and p components into said first and second spatially separated beams;

phase retarding means optically aligned with one of said spatially separated beams for retarding the phase of one of the unequally divided polarization components with respect to the other unequally divided polarization component of said spatially separated beams passing through said phase retarding means for providing a phase retarded spatially separated beam;

polarizing beamsplitting means optically aligned with said phase retarded first spatially separated beam and with said second spatially separated beam, respectively, for producing first and second pairs of spatially separated output beams, respectively, each having mutually orthogonal linear polarizations with each of said first pair of output beams having substantially equal amounts of the s and p polarization components of said phase retarded first spatially separated beam and with each of said second pair of output beams having substantially equal amounts of the s and p polarization components of said second spatially separated beam;

photodetector means optically aligned with each of said output beams for producing a set of electrical signals proportional to the respective output beam intensities of said output beams; and means for determining at least the relative intensities of the unequally divided s and p polarization components of said test beam from said electrical signals for measuring the relative strengths of the s and p polarizations of said test beam.

* * * * *